US012632202B2

(12) United States Patent
Sun et al.

(10) Patent No.: US 12,632,202 B2
(45) Date of Patent: May 19, 2026

(54) IMAGE DISPLAY METHOD, IMAGE DISPLAY APPARATUS, DEVICE AND STORAGE MEDIUM

(71) Applicant: SOUTHERN UNIVERSITY OF SCIENCE AND TECHNOLOGY, Shenzhen (CN)

(72) Inventors: Xiaowei Sun, Shenzhen (CN); Philip Anthony Surman, Shenzhen (CN); Chaojian Zhang, Shenzhen (CN); Zhenwei Yao, Shenzhen (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 38 days.

(21) Appl. No.: 18/727,250

(22) PCT Filed: Jun. 14, 2022

(86) PCT No.: PCT/CN2022/098766
§ 371 (c)(1),
(2) Date: Jul. 8, 2024

(87) PCT Pub. No.: WO2023/201864
PCT Pub. Date: Oct. 26, 2023

(65) Prior Publication Data
US 2025/0094106 A1 Mar. 20, 2025

(30) Foreign Application Priority Data
Apr. 22, 2022 (CN) .......................... 202210426720.9

(51) Int. Cl.
*G09G 5/00* (2006.01)
*G06F 3/14* (2006.01)
*G06T 7/50* (2017.01)

(52) U.S. Cl.
CPC .................. *G06F 3/14* (2013.01); *G06T 7/50* (2017.01); *G06T 2207/20081* (2013.01); *G06T 2207/20084* (2013.01)

(58) Field of Classification Search
CPC ... G06F 3/14; G06T 7/50; G06T 2207/20081; G06T 2207/20084
(Continued)

(56) References Cited

U.S. PATENT DOCUMENTS

2016/0255338 A1* 9/2016 Song ........................ G03H 1/08
348/47
2020/0226816 A1* 7/2020 Kar ........................... G06T 7/50
(Continued)

FOREIGN PATENT DOCUMENTS

CN 107155101 A 9/2017
CN 108495117 A 9/2018
(Continued)

OTHER PUBLICATIONS

International Search Report and Written Opinion of the International Searching Authority issued by the China National Intellectual Property Administration for International Patent Application No. PCT/CN2022/098766, mailed on Jan. 4, 2023, with an English translation.
First Office Action and Search Report issued by CNIPA for Chinese Patent Application No. 202210426720.9, mailed on Jun. 20, 2025, with an English translation.

*Primary Examiner* — Jennifer T Nguyen
(74) *Attorney, Agent, or Firm* — MYERS WOLIN, LLC

(57) ABSTRACT

An image display method, an image display apparatus, a device and a storage medium. The method includes: acquiring an original image (S100); performing image analysis on the original image according to a preset image analysis model, so as to obtain a target depth map (S200); performing image synthesis on the target depth map according to a preset virtual viewpoint synthesis algorithm, so as to obtain
(Continued)

a plurality of target images of different viewing angles (S300); compiling the plurality of target images of different viewing angles, so as to obtain a target image set (S400); and transmitting the target images in the target image set to different directions by means of a light-splitting device, so as to present the plurality of target images of different viewing angles (S500).

20 Claims, 8 Drawing Sheets

(58) Field of Classification Search
USPC ......................................................... 345/156
See application file for complete search history.

(56) References Cited

U.S. PATENT DOCUMENTS

| | | | |
|---|---|---|---|
| 2020/0241290 A1 * | 7/2020 | Breese | ............... G02B 27/0081 |
| 2020/0288099 A1 * | 9/2020 | Sheng | .................. H04N 13/167 |

FOREIGN PATENT DOCUMENTS

| | | |
|---|---|---|
| CN | 110400337 A | 11/2019 |
| CN | 111667438 A | 9/2020 |
| CN | 111669570 A | 9/2020 |
| CN | 112255820 A | 1/2021 |
| CN | 112799237 A | 5/2021 |
| JP | 2014-135006 A | 7/2014 |

* cited by examiner

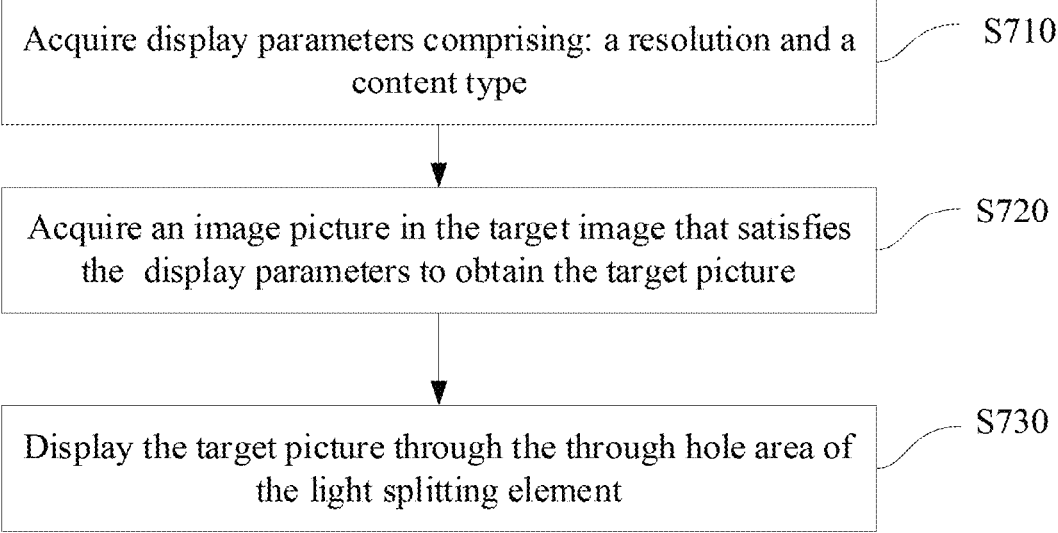

Acquire display parameters comprising: a resolution and a content type — S710

Acquire an image picture in the target image that satisfies the display parameters to obtain the target picture — S720

Display the target picture through the through hole area of the light splitting element — S730

FIG. 7

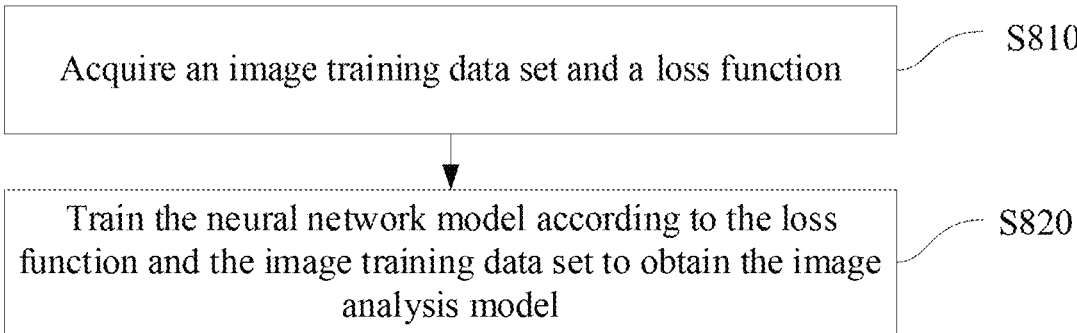

Acquire an image training data set and a loss function — S810

Train the neural network model according to the loss function and the image training data set to obtain the image analysis model — S820

IMAGE DISPLAY METHOD, IMAGE DISPLAY APPARATUS, DEVICE AND STORAGE MEDIUM

CROSS-REFERENCE TO RELATED APPLICATION

This application is a national stage filing under 35 U.S.C. § 371 of international application number PCT/CN2022/098766, filed Jun. 14, 2022, which claims priority to Chinese patent application No. 202210426720.9 filed Apr. 22, 2022. The contents of these applications are incorporated herein by reference in their entirety.

TECHNICAL FIELD

The present disclosure relates to the technical field of image processing, and in particular to an image display method, an image display device, equipment, and a storage medium.

BACKGROUND

The traditional implementation of 3D mainly uses a display to display images from two different viewing angles to left and right eyes, so as to produce a perceivable three-dimensional image in the brain through the stereo disparity characteristics of the image.

In related art, the main cause of generation of 3D images is the "visual shift" of eyes. The currently mature polarized 3D display mainly requires the use of 3D glasses to view 3D images. However, wearing 3D glasses for a long time not only makes users uncomfortable, but also has a huge impact on the user's vision.

SUMMARY

The present disclosure aims to at least partially alleviate one of the technical problems existing in the existing technology. To this end, the present disclosure proposes an image display method that can directly display target images from different viewing angles without wearing 3D glasses, thereby improving the convenience of viewing 3D images.

The present disclosure also proposes an image display device.

The present disclosure also proposes an electronic equipment.

The present disclosure also proposes a computer-readable storage medium.

In a first aspect, an embodiment of the present disclosure provides an image display method.

The method includes:

acquiring an original image;

performing image analysis on the original image according to a pre-set image analysis model to obtain a target depth map;

performing image synthesis on the target depth map according to a pre-set virtual viewpoint synthesis algorithm to obtain a plurality of target images from different viewing angles;

collecting the plurality of the target images from different viewing angles to obtain a target image set; and emitting, by light splitting element, the plurality of target images in the target image set to different directions to display the plurality of the target images from different viewing angles.

2

The image display method according to the embodiment of the present disclosure has at least the following beneficial effects. Image analysis is performed on the original image by the image analysis model to obtain the target depth map, and image synthesis is performed on the target depth map by the virtual viewpoint synthesis algorithm to obtain the plurality of the target images from different viewing angles. The light splitting element then directly emit the plurality of the target images from different viewing angles to different directions, such that the target user can view the target images from different viewing angles by changing the viewing angle, and can view 3D images without wearing 3D glasses, thereby not only improving the convenience of 3D image viewing, but also reducing the discomfortableness of 3D image viewing.

According to the image display method in some other embodiments of the present disclosure, after emitting, by the light splitting element, the plurality of target images in the target image set to different directions to display the plurality of the target images from different viewing angles, the method further includes:

adjusting a target image in a primary vision area of the target user, specifically including:

acquiring viewing angle information of the target user;

determining the primary vision area of the target user according to the viewing angle information; and switching the target image in the primary vision area to a target image from the plurality of the target images corresponding to the viewing angle information.

According to the image display method in some other embodiments of the present disclosure, the light splitting element is provided with a light splitting area and a through hole area, and emitting, by the light splitting element, the plurality of target images in the target image set to different directions to display the plurality of the target images from different viewing angles includes:

emitting, by the light splitting area of the light splitting element, the plurality of target images in the target image set to different directions to display the plurality of the target images from different viewing angles.

According to the image display method in some other embodiments of the present disclosure, after emitting, by the light splitting element, the plurality of target images in the target image set to different directions to display the plurality of the target images from different viewing angles, the method further includes:

displaying a target picture in the target image through the through hole area of the optical splitting equipment, specifically including:

acquiring display parameters, including: a resolution and a content type;

acquiring the image picture in the target image that satisfies the display parameters to obtain the target picture; and displaying the target picture through the through hole area of the optical splitting equipment.

According to the image display method in some embodiments of the present disclosure, before performing image analysis on the original image according to the pre-set image analysis model to obtain the target depth map, the method further includes:

training a neural network model to obtain the image analysis model, specifically including:

acquiring an image training data set and a loss function; and training the neural network model according to the loss function and the image training data set to obtain the image analysis model.

In a second aspect, an embodiment of the present disclosure provides an image display device, including:

an acquisition module, configured to acquire an original image;

an analysis module, configured to perform image analysis on the original image according to a pre-set image analysis model to obtain a target depth map;

a synthesis module, configured to perform image synthesis on the target depth map according to a pre-set virtual viewpoint synthesis algorithm to obtain a plurality of target images from different viewing angles;

a collection module, configured to collect the plurality of target images from different viewing angles to obtain a target image set; and a light splitting element, configured to emit the target images in the target image set to different directions to display the plurality of the target images from different viewing angles.

The image display device according to the embodiment of the present disclosure has at least the following beneficial effects. image analysis is performed on the original image by the image analysis model to obtain the target depth map, and image synthesis is performed on the target depth map by the virtual viewpoint synthesis algorithm to obtain plurality of target images from different viewing angles. The light splitting element then directly emits the plurality of the target images from different viewing angles to different directions, such that the target user can view target images from different viewing angles by changing the viewing angle, and can view 3D images without wearing 3D glasses, thereby not only improving the convenience of 3D image viewing, but also reducing the discomfortableness of 3D image viewing.

According to the image display device in some other embodiments of the present disclosure, the acquisition module, the analysis module, the synthesis module, and the collection module are integrated in an image processing terminal device, and the light splitting element includes: a grating screen and a housing, where the grating screen is carried on the housing, the housing is sleeved on the image processing terminal device, and the housing is adapted to the image processing terminal device.

According to the image display device in some other embodiments of the present disclosure, the image processing terminal device is provided with a first image collector, the housing defines an opening corresponding to the first image collector, the housing is provided with a through hole area, and the housing is provided with second image collectors located on both sides of the grating screen.

In a third aspect, an embodiment of the present disclosure provides an electronic equipment, including:

at least one processor; and, a memory communicatively connected to the at least one processor; where the memory stores an instruction executable by the at least one processor, and the instruction when executed by the at least one processor, causes the at least one processor to execute the method according to the first aspect.

In a fourth aspect, an embodiment of the present disclosure provides a computer-readable storage medium, where the computer-readable storage medium stores a computer-executable instruction, and the computer-executable instruction, when executed by a computer, causes the computer to execute the method according to the first aspect.

Additional features and advantages of the present disclosure will be set forth in the description which follows, and in part will be apparent from the description, or may be learned by practice of the present disclosure. The objectives and other advantages of the present disclosure may be realized and obtained by the structure particularly pointed out in the specification and drawings.

BRIEF DESCRIPTION OF DRAWINGS

FIG. 7 is a schematic flowchart of the image display method in an embodiment of the present disclosure;

FIG. 8 is a schematic flowchart of the image display method in an embodiment of the present disclosure;

Figure 1:
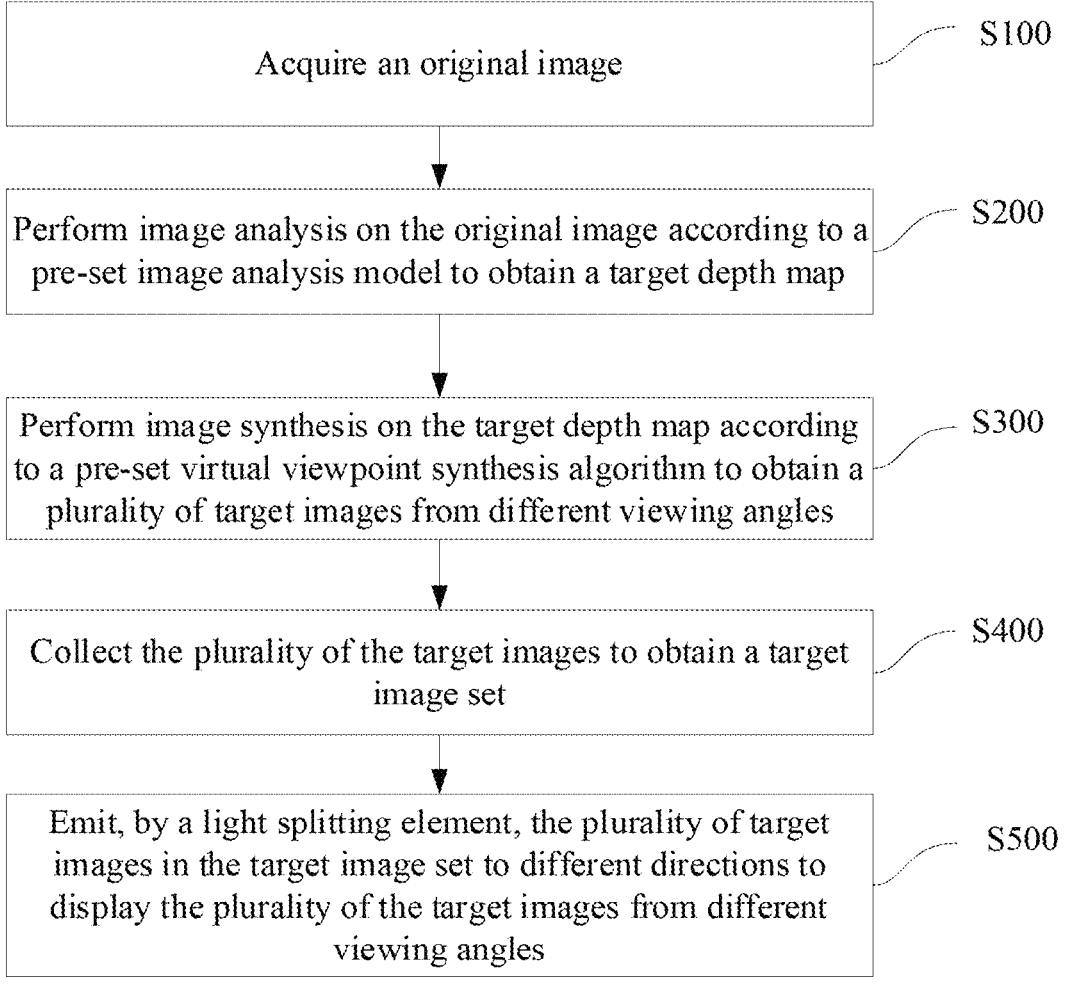
FIG. 1 is a schematic flowchart of an image display method in an embodiment of the present disclosure.

List of reference numerals: 100. image processing terminal device; 110. acquisition module; 120. analysis module; 130. synthesis module; 140. collection module; 150. first image collector; 200. light splitting element; 210. grating screen; 220. housing; 221. opening; 222. through hole area; 230. second image collector.

DETAILED DESCRIPTION

The concept of the present disclosure and the technical effects produced will be clearly and completely described below with reference to the embodiments, so as to fully understand the objectives, features and effects of the present disclosure. Apparently, the described embodiments are merely some, rather than all, of the embodiments of the present disclosure. Based on the embodiments of the present disclosure, other embodiments obtained by those skilled in the art without making creative efforts all shall fall within the protection scope of the present disclosure.

In the description of the present disclosure, if the orientation description is involved, for example, the orientation or positional relationship indicated by "top", "bottom", "front", "back", "left", "right", etc. is based on the orientation or positional relationship shown in the accompanying drawings. The orientation or positional relationship is only for the convenience of describing the present disclosure and simplifying the description, rather than indicating or implying that the device or element referred to must have a specific orientation, be constructed and operated in a specific orientation, and therefore cannot be understood as a limitation of the present disclosure. If a feature is said to be "set", "fixed", "connected", or "mounted" to another feature, it may be set, fixed, or connected directly to the other feature, or it may be set, fixed, connected, and mounted indirectly on another feature.

In the description of the embodiments of the present disclosure, if "several" is involved, it means more than one; if "a plurality of" is involved, it means more than two; if "greater than", "less than", "more than" are involved, they should be understood as excluding the number being referred to. If "above", "below", and "within" are involved, they should be understood as including the number being referred to. If "first" and "second" are involved, they should be understood as being used to distinguish technical features, rather than be understood as indicating or implying the relative importance or implicitly indicating the number of indicated technical features or implicitly indicating the precedence relationship of the indicated technical features.

In current life, the images viewed by users through electronic equipment are 2D images. Since the 2D images contain visual information without depth, but the real world has depth, the benefit of perceiving depth can not only improve the authenticity of image viewing, but also convey more information.

In order to realize 3D image display, a display is arranged in the related art, and the display displays the images from two different viewing angles to the left eye and the right eye, such that a perceivable three-dimensional image can be generated in the brain through the stereo disparity characteristics of the image. In addition, another 3D image display is to reproduce the image in space. This method includes: volumetric, holography, light field, integral imaging and multiview or super multiview (SMV). Therefore, as the digital audio-visual technology enters the era of high definition, the stereoscopic display technology has developed into another focus in the development process of the digital audio-visual technology after high-definition display. Different from the upgrade from standard definition to high definition, the improvement of 3D image display technology is a new multi-dimensional leap and a breakthrough technological innovation. 3D image display in related art requires the use of 3D glasses, however, wearing 3D glasses for a long time will have a huge impact on the user's vision and have many adverse effects on people's health.

On this basis, an image display method, an image display device, equipment, and a storage medium are provided in some embodiments of the present disclosure. By generating a plurality of target images from different viewing angles and emitting the plurality of the target images from different viewing angles to different directions through light splitting element, the user can view the 3D displayed image by emitting the target images from different viewing angles through the light splitting element, without the need to wear 3D glasses and without the need for human eye tracking to implement 3D image display.

Referring to FIG. 1, a schematic flowchart of an image display method in an embodiment of the present disclosure is shown. The embodiment of the present disclosure discloses an image display method. The method includes: step S100, step S200, step S300, step S400, and step S500. It can be understood that the image display method includes, but is not limited to, step S100 to step S500.

At Step S100: an original image is acquired.

It should be noted that the original image is determined according to the current application scenario, such that the corresponding original image is obtained according to the current application scenario. For example, if the current application scenario is image viewing, a viewing instruction is received, and the corresponding image is obtained from the image database according to the viewing instruction to obtain the original image. If the current application scenario is a video call, the image of the caller in the video call is captured to obtain the original image.

In an implementation, if the current application scenario is the video call, the image of the caller is acquired through the image collector to obtain the original image.

At Step S200: image analysis is performed on the original image according to a pre-set image analysis model to obtain the target depth map.

It should be noted that the pre-set image analysis model is configured to analyze a single original image, and the image analysis model performs depth evaluation on the original image to obtain the target depth map.

At Step S300: image synthesis is performed on the target depth map according to a pre-set virtual viewpoint synthesis algorithm to obtain a plurality of the target images from different viewing angles.

It should be noted that in a two-dimensional display, the distribution of light emitted by each pixel in different directions is usually Lambertian distribution, so the target image viewed by the user in the two-dimensional display is a flat image. However, in a three-dimensional display, the light emitted by each pixel is basically not identical in all direction. For example, in the two-dimensional display, if a depicted object appears in front of the screen, its position will not change as the viewing angle changes, whereas in the three-dimensional display, if the object appears in front of the screen, its position on the screen must move to the left as the viewing position moves to the right and vice versa. Therefore, the virtual viewpoint synthesis algorithm is employed to perform image synthesis based on the target depth map, that is, a three-dimensional model corresponding to the original image is constructed through the target depth map, and then the three-dimensional model is segmented to obtain the plurality of the target images from different viewing angles. A 3D image display can be presented through the plurality of the target images from different viewing angles.

At Step S400: the plurality of the target images from different viewing angle are collected to obtain a target image set.

It should be noted that 3D image display requires the plurality of the target images from different viewing angles to be presented at the same time, and the plurality of target images from different viewing angles are presented in different directions, such that 3D image viewing can be implemented. Therefore, by collecting the plurality of the target images from different viewing angles to obtain a target image set, that is, a 3D image is synthesized, the 3D image can be displayed. The viewing angles of the plurality of the target images in the target image set are different.

For example, if the current application scenario is a video call, the original image of the caller is acquired in real time, and the plurality of the target images from different viewing angles are obtained in real time. The plurality of the target images from different viewing angles are collected to obtain a target image set, that is, the 3D call picture of the current video call is obtained.

At Step S500: the target images in the target image set is emitted by the light splitting element to different directions to display the plurality of the target images from different viewing angles.

It should be noted that in order to realize 3D image display, the plurality of the target images from different viewing angles need to be emitted to different directions. Therefore, by changing the viewing angle when viewing the target images, the target images in 3D format can be seen. Therefore, by arranging the light splitting element, the target images in the target image set are emitted to different directions through the light splitting element. Since the viewing angles between the plurality of the target images are different, the light splitting element determines the emission direction according to the viewing angles of the target images to emit the target images of the corresponding viewing angles in the corresponding emission directions. Then the user views the target images emitted by the light splitting element. By changing the viewing angle to view the target images from different angles to implement 3D viewing of the target images. If the light splitting element is not employed, only the target image from one viewing angle will be displayed. No matter how the user changes the viewing angle, the target image will be the same.

Figure 2:
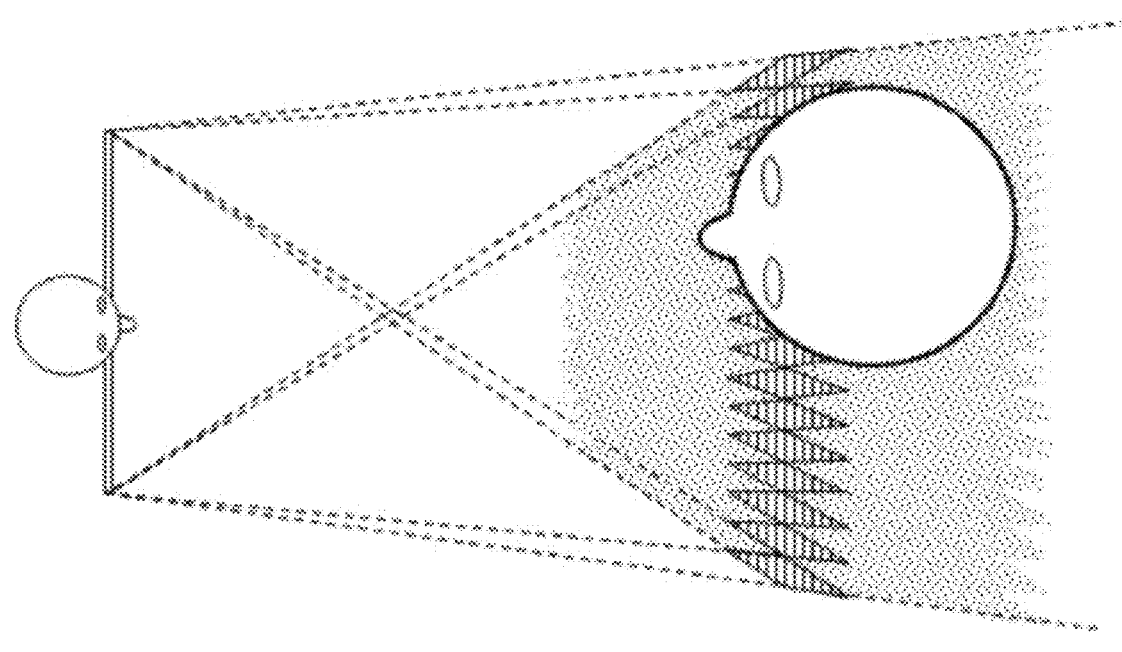
FIG. 2 is a schematic diagram of a video call in the image display method in an embodiment of the present disclosure.

In an example, please referring to FIG. 2, the light splitting element is indicated by a horizontal bar on the head of a little person. In the case that the current application scenario is a video call, the plurality of the target images from different viewing angles are emitted to the corresponding directions through the light splitting element. When the target user looks directly at the light splitting equipment, the front face of the caller in the video call can be viewed. After moving to the left, the side face of the caller can be viewed through the light splitting element. If the target user moves to the right, the other side of the person's face can be viewed. Therefore, by emitting the target images from different viewing angles to corresponding directions through the light splitting element, 3D video call can be implemented for the user during video call, which can not only improve the target user's experience, but also reduce the user's discomfortableness when wearing 3D glasses.

In summary, the original image is analyzed through the pre-set image analysis model to obtain the target depth map, and image synthesis is performed on the target depth map according to the virtual viewpoint synthesis algorithm, that is, the three-dimensional model is synthesized based on the target depth map, and then the three-dimensional model is segmented to obtain the plurality of the target images from different viewing angles. A target image set is obtained by collecting the plurality of the target images from different viewing angles, that is, a 3D image is synthesized. Finally, the target images from different viewing angles are emitted to their respective directions through the light splitting element, and the target user can view the target images from different viewing angles through the light splitting element. Therefore, 3D image viewing can be implemented without wearing 3D glasses, which not only improves the target user's visual sense of viewing images, but also reduces the target user's discomfortableness.

In some embodiments of the present disclosure, after performing step S500, the image display method further includes, but is not limited to, the step: a target image in a primary vision area of the target user is adjusted.

It should be noted that in order to improve the target user's experience of viewing images or video calls, the target image in the primary vision area of the target user needs to be adjusted according to the target user's selection, such that the target user always looks directly at the front of the target image. By acquiring the target viewing angles of the plurality of the target images, a target image whose target viewing angle is a front elevation angle is acquired from the plurality of target images, and the target image corresponding to the front elevation angle is displayed in the primary vision area of the target user, such that the target user always looks directly at the target image.

Figure 3:
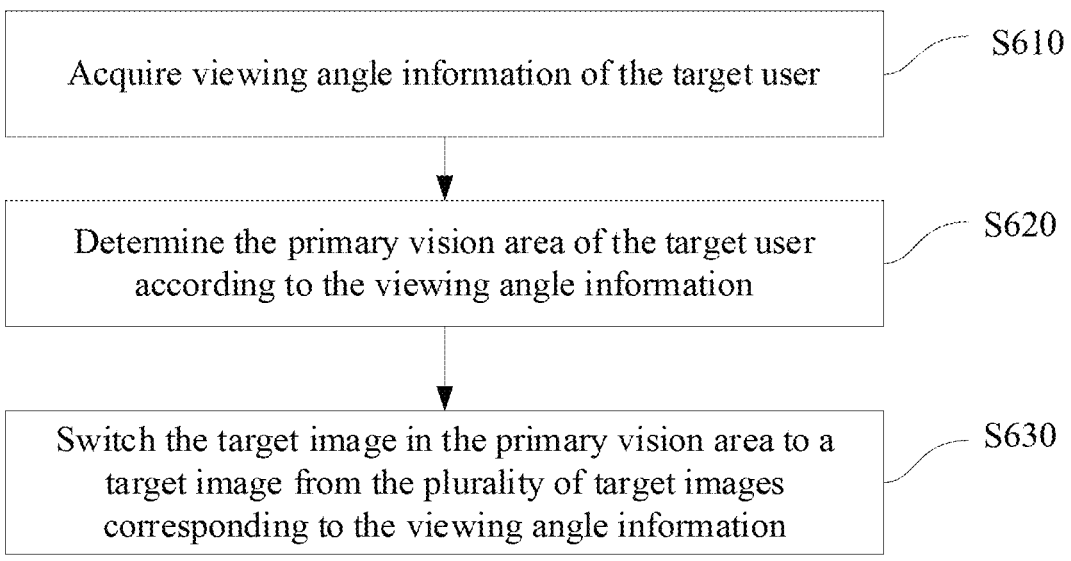
FIG. 3 is a schematic flowchart of the image display method in another embodiment of the present disclosure.

Referring to FIG. 3, in an embodiment, adjusting the target image in the primary vision area of the target user includes, but is not limited to, step S610, step S620, and step S630.

At Step S610: viewing angle information of the target user is acquired.

It should be noted that since the target user will continuously change the viewing angle when viewing images or making video calls, the viewing angle information of the target user is acquired according to the pre-set time interval periodically to determine the current viewing angle of the target user. The viewing angle information of the target user is acquired through a head position tracker. For example, if the current application scenario is a video call, the head angle of the target user is acquired through the head position tracker to determine the viewing angle information of the target user.

At Step S620: the primary vision area of the target user is determined according to the viewing angle information.

It should be noted that the current viewing angle of the target user is determined through the viewing angle information, and the primary vision area of the target user is determined according to the viewing angle information.

Figure 4:
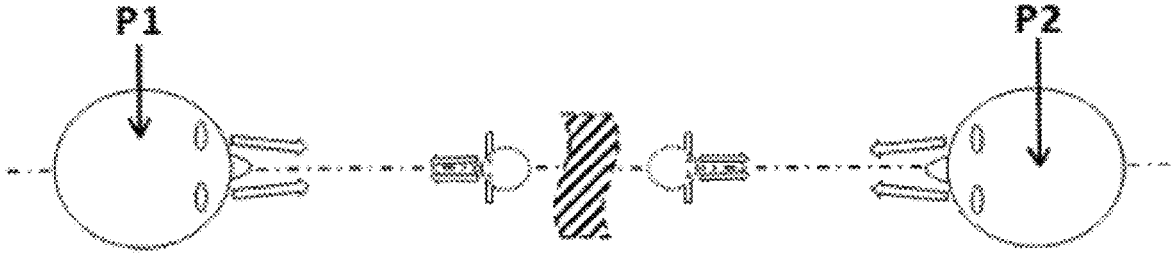
FIG. 4 is a schematic diagram of a video call in the image display method in an embodiment of the present disclosure.

Please referring to FIG. 4, for example, P1 refers to the target user and P2 refers to the caller. If the current application scenario is a video call, the viewing angle areas in front of the target user are determined as six areas: A, B, C, D, E, and F, each spanning an angle of 30°. When the acquired viewing angle information of the target user is 45°, it can be determined that the primary vision area of the target user is the area B. If the acquired viewing angle information of the target user is 90°, it is determined that the primary vision area of the target user is the area C.

At Step S630: the target image of the primary vision area is switched to a target image corresponding to the viewing angle information.

It should be noted that the light splitting element can emit the target images from different viewing angles to different directions to implement 3D display. However, when the user needs to always look directly at the target image at a specific viewing angle, the target image in the primary vision area should be switched to another target image from the plurality of target images corresponding to the specific viewing angle according to the primary vision area of the target user, so as to improve the experience of target user.

Figure 5:
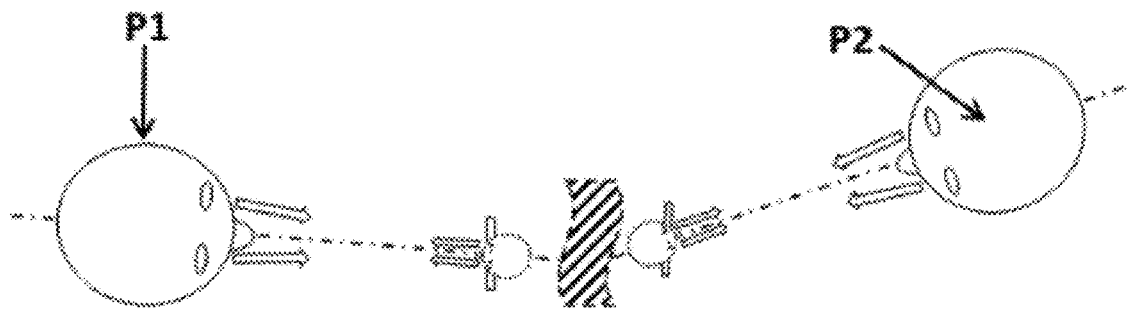
FIG. 5 is a schematic diagram of a video call in the image display method in an embodiment of the present disclosure.

In an example, please referring to FIG. 5, if the current application scenario is a video call, in order to ensure that the target user always looks directly at the caller, such that both parties can make eye contact in the video call application, the currently displayed target image needs to be adapted in real time. Then, the target viewing angle of the target image is acquired, and according to the changed primary vision area of the target user, the target image from the direct angle is displayed in the changed primary vision area, such that the target user can make eye contact with the caller in real time. Referring to FIG. 5, it can be seen that by adjusting the target image displayed in the primary vision area of the target user to the target image corresponding to the viewing angle information, the target user and the caller face each other. In addition, no matter how the viewing angle of the target user changes, the caller also always looks directly at the target user.

Figure 6:
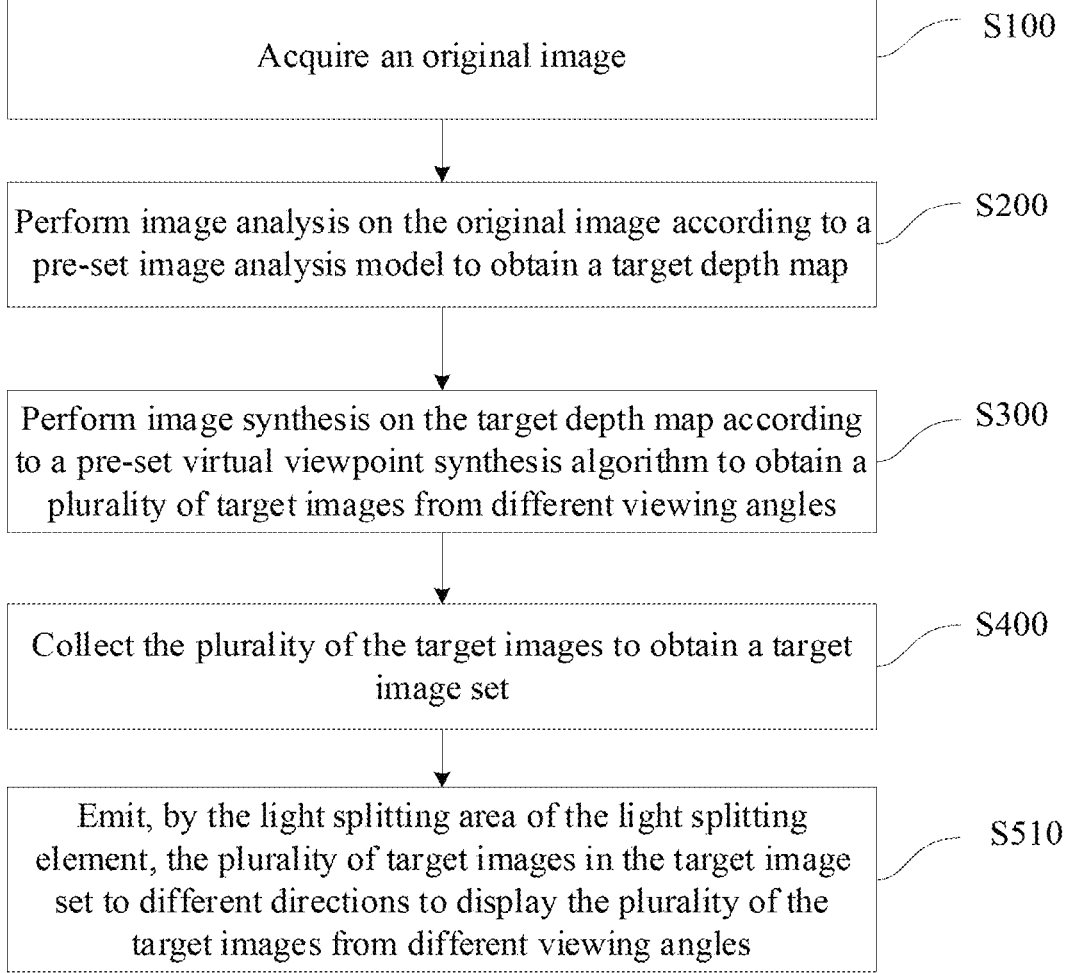
FIG. 6 is a flowchart of a step S500 in FIG. 1.

Please referring to FIG. 6, in some embodiments of the present disclosure, the light splitting element is provided with a light splitting area and a through hole area, and step S500 may include, but is not limited to, step S510.

At Step S510: the light splitting area of the light splitting element emits the target images in the target image set to different directions to display the plurality of the target images from different viewing angles.

It should be noted that since the resolution of the 3D target image presented by the light splitting element is low, and the light splitting element will lose the resolution of the target image, making it difficult to see small text clearly. Therefore, by arranging the light splitting area and the through hole area on the light splitting element, the light splitting area emits target images from different viewing angles to different directions to implement 3D display of the target image, and images or text that require high resolution viewing are viewed through the through hole area, which can not only view 3D images, but also view high-resolution images and text, improving the user experience of the target users.

In an implementation, a grating screen is provided as the light splitting area. The grating screen can realize the multi-view display principle, and the 3D target image can be viewed without wearing 3D glasses.

In some embodiments of the present disclosure, after performing step S500, the image display method further includes, but is not limited to, the step: a target picture in the target image is displayed through the through hole area of the light splitting element.

It should be noted that in order to facilitate the target users to view high-resolution images or texts, the through hole area needs to be arranged on the light splitting element to display the target picture in the target image, so as to implement simultaneous viewing of an 3D image and high-resolution screens, thereby improving the experience of target users.

Referring to FIG. 7, in an embodiment, displaying the target picture in the target image through the through hole area of the light splitting element includes, but is not limited to, step S710, step S720, and step S730.

At Step S710: the display parameters are acquired, which include: a resolution and a content type.

It should be noted that the acquired display parameters are customized by the target user. Through the resolution and content type customized by the target user, the target picture that the target user wants to view and meets the display parameters can be determined.

At Step S720: an image picture that satisfies the display parameters in the target image is acquired to obtain the target picture.

It should be noted that the image content and text content in the target image are identified to obtain the image content and text content that meet the display parameters to obtain the target picture.

In an example, if the resolution is 1000 ppi and the content type is text, the text content in the target image with a resolution that meets 1000 ppi is acquired to obtain the target picture.

At Step S730: the target picture is displayed through the through hole area of the light splitting element.

It should be noted that steps S100 to S400 are executed by an image processing terminal device, and the image processing terminal device is provided with the light splitting element. The light splitting element is covered in front of a display screen of the image processing terminal device. Since the through hole area of the light splitting element does not block the display screen of the image processing terminal device and the target picture is arranged in an area of the display screen of the image processing terminal device corresponding to the through hole area, then the target picture on the display screen can be directly viewed through the through hole area, thereby implementing viewing of high-resolution texts or images.

In some embodiments of the present disclosure, the image display method further includes, but is not limited to, the step: the neural network model is trained to obtain the image analysis model.

It should be noted that in order to ensure that the image analysis model can analyze and construct a plurality of target depth maps from different viewing angles based on the original image to improve the accuracy of the target depth map, the neural network model is trained in advance to obtain the image analysis model.

Referring to FIG. 8, in an embodiment, training the neural network model to obtain the image analysis model includes, but is not limited to, step S810 and step S820.

At Step S810: an image training data set and a loss function are acquired.

It should be noted that the image training data set is collected, where the image training data set includes images in different viewing angle directions. According to the loss function pre-set by the target user, the training requirements of the neural network model can be determined according to the loss function.

Step S820: the neural network model is trained according to the loss function and the image training data set to obtain the image analysis model.

It should be noted that the image training data set is inputted into the neural network model, and the neural network model is continuously iterated by means of a gradient descent method to adjust the parameters of the neural network model according to the loss function until the neural network model converges to obtain the image analysis model.

Figure 9:
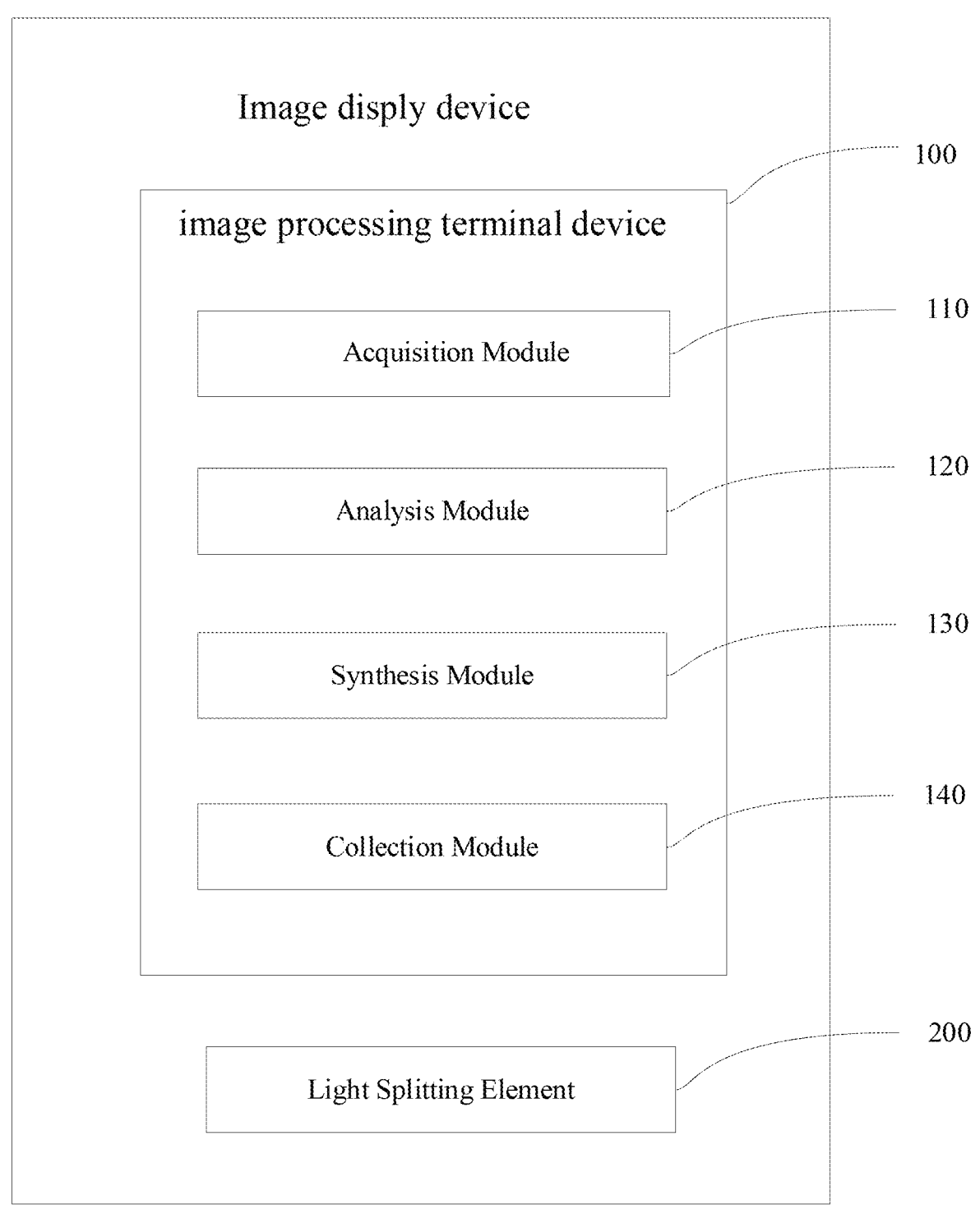
FIG. 9 is a module block diagram of an image display device in an embodiment of the present disclosure.

In addition, please referring to FIG. 9, an embodiment of the present disclosure further discloses an image display device. The device includes: an acquisition module 110, configured to acquire an original image; an analysis module 120, configured to perform image analysis on the original image according to a pre-set image analysis model to obtain a target depth map; a synthesis module 130, configured to perform image synthesis on the target depth map according to a pre-set virtual viewpoint synthesis algorithm to obtain a plurality of target images from different viewing angles; a collection module 140, configured to collect the plurality of the target images from different viewing angles to obtain a target image set; and a light splitting element 200, configured to emit the target images in the target image set to different directions to display the plurality of the target images from different viewing angles.

In the technical scheme of the present disclosure, image analysis is performed on the original image by the pre-set image analysis model to obtain the target depth map, and image synthesis is performed on the target depth map according to the virtual viewpoint synthesis algorithm, that is, the three-dimensional model is synthesized according to the target depth map, and then the three-dimensional model is segmented to obtain the plurality of the target images from different viewing angles. A target image set is obtained by gathering the plurality of the target images from different viewing angles, that is, a 3D image is synthesized. Finally, the target images from different viewing angles are emitted to corresponding directions through the light splitting element 200, such that the target user can view the target images from different viewing angles through the light splitting element 200. Therefore, 3D image viewing can be achieved without wearing 3D glasses, which not only improves the visual sensation of the target user in viewing, but also reduces the discomfortableness of the target user.

The image display device in the embodiment of the present disclosure is configured to perform the image display method shown in FIGS. 1 to 9 in the above embodiments. The specific processing process is the same as the image display method in the above embodiments, and will not be described again here.

Figure 10:
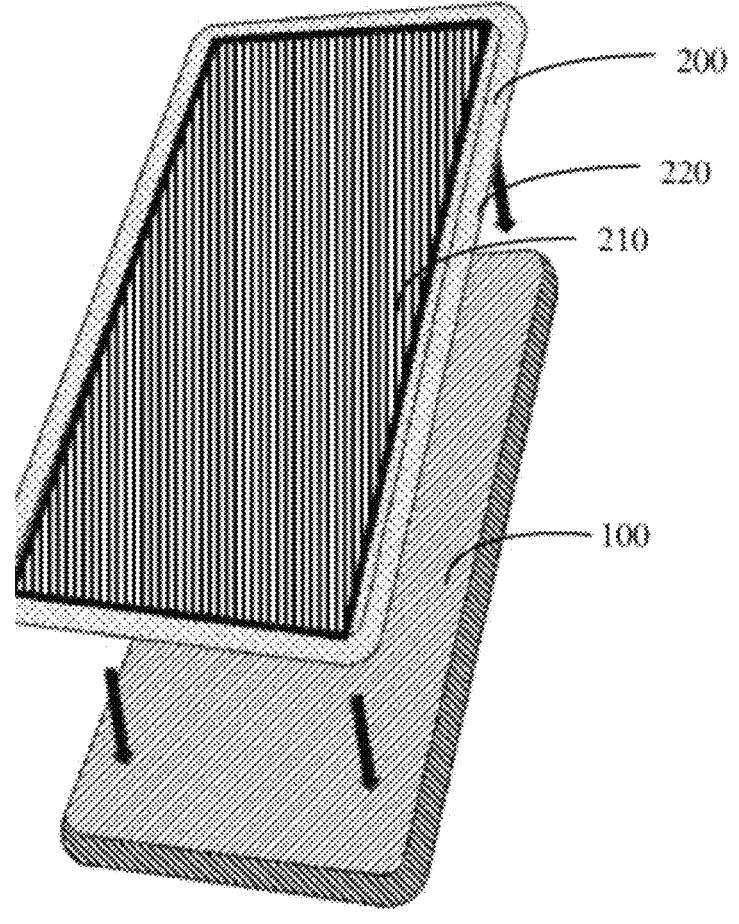
FIG. 10 is a schematic structural diagram of the image display device in an embodiment of the present disclosure.

Please referring to FIG. 10, the acquisition module 110, the analysis module 120, the synthesis module 130, and the collection module 140 are integrated in the image processing terminal device 100. The light splitting element 200 includes: a grating screen 210 and a housing 220, where the grating screen 210 is carried on the housing 220, the housing 220 is sleeved on the image processing terminal device 100, and the housing 220 is adapted to the image processing terminal device 100.

For example, if the image processing terminal device 100 is a mobile terminal device, the housing 220 is a housing 220 of the mobile terminal device, and the housing 220 is adapted to the image processing terminal device 100. When it is necessary to view a 3D target image or make a 3D video call, the grating screen 210 of the housing 220 can be placed in front of the display screen of the image processing terminal device 100. If there is no need to view the 3D image, the housing 220 is sleeved on the back side of the image processing terminal device 100, which can not only protect the image processing terminal device 100, but also prevent the housing 220 from being lost and difficult to find.

Figure 11:
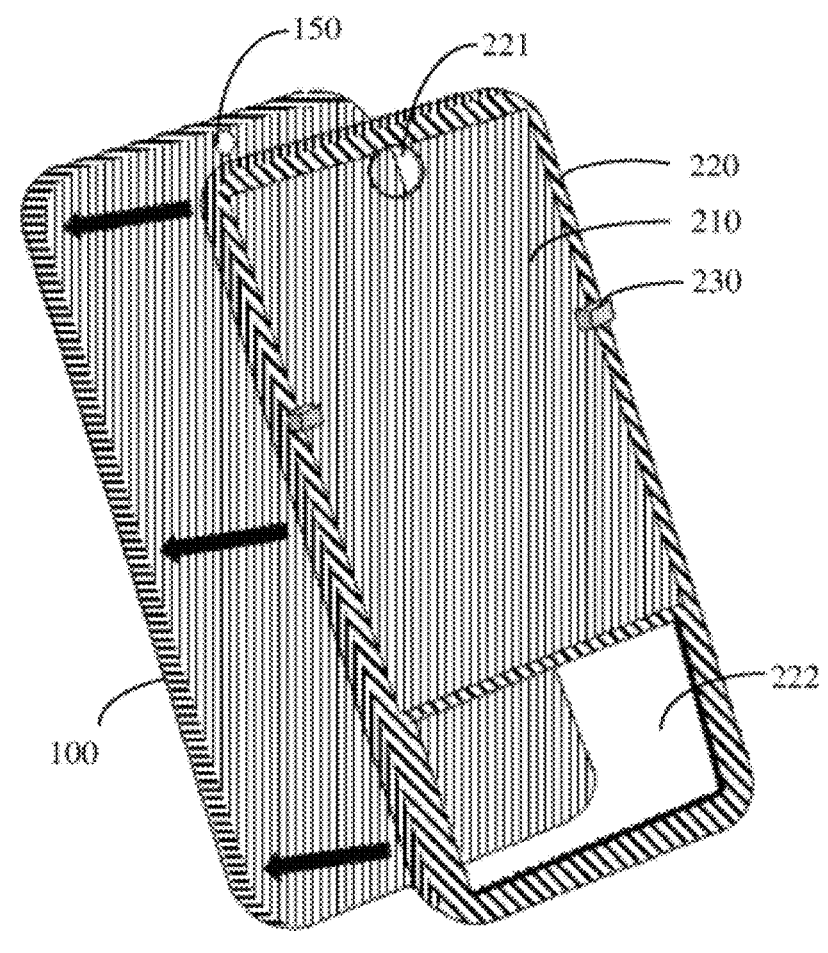
FIG. 11 is a schematic structural diagram of the image display device in an embodiment of the present disclosure.

Please referring to FIG. 11, the image processing terminal device 100 is provided with a first image collector 150. The housing 220 defines an opening 221 corresponding to the first image collector 150. The housing 220 is provided with a through hole area 222. The housing 220 is provided with second image collectors 230 located on both sides of the grating screen 210.

If the current application scenario is a video call, it is needed to acquire a character image of the target user for the original image, and the original image needs to be collected by the first image collector 150. By forming the opening 221 in the housing 220, the first image collector 150 collects the character image of the target user through the opening 221 to obtain the original image, which, thus, provides the first image collector 150 with a clear view. Since additionally arrangement of the grating screen 210 will cause the resolution loss of the display screen of the image processing terminal device 100, it will be more difficult to read the text. Since the range collected by the image processing terminal device 100 exceeds the size of a human head, the through hole area 222 is arranged to be directly connected to the display screen, such that high-resolution screenshots or texts can be displayed through the through hole area 222, thereby improving the reading experience of the target user. By arranging the second image collectors 230 on the grating screen 210, the clarity of the collected original image can be improved, and the performance of 3D display can be enhanced.

Figure 12:
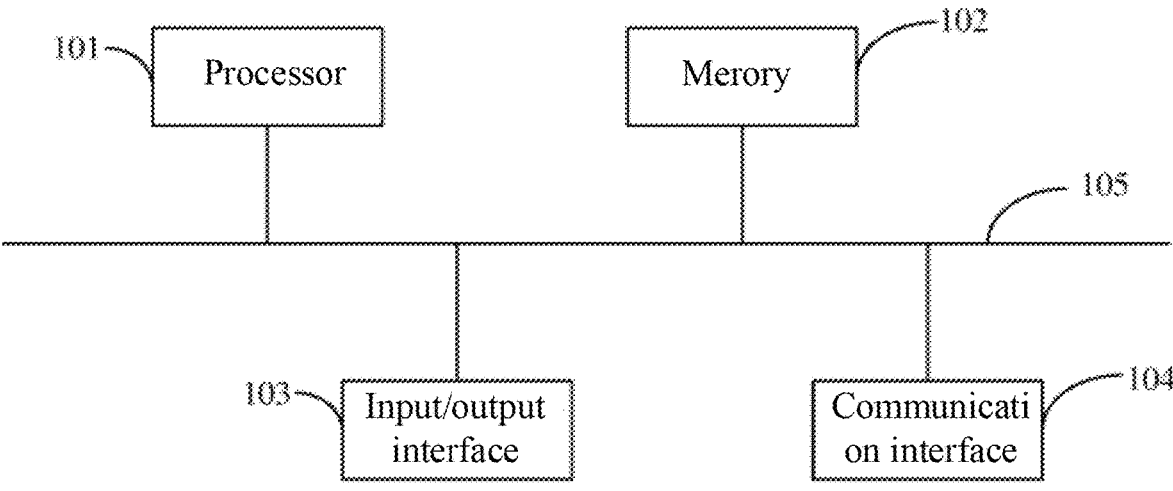
FIG. 12 is a module block diagram of an electronic equipment in an embodiment of the present disclosure.

FIG. 12 illustrates a hardware structure of electronic equipment according to another embodiment. Please referring to FIG. 12, the electronic equipment includes:

a processor 101, which can be implemented by a general Central Processing Unit (CPU), a microprocessor, an Application Specific Integrated Circuit (ASIC), or one or more integrated circuits, and is configured to execute relevant programs to implement the technical schemes provided by the embodiments of the present disclosure;

a memory 102, which can be implemented in the form of a Read Only Memory (ROM), a static storage device, a dynamic storage device or a Random Access Memory (RAM), where the memory 102 can store operating systems and other application programs; when the technical schemes provided by the embodiments of this specification are implemented through software or firmware, relevant program codes are stored in the memory 102 and called by the processor 101 to execute the image display method in the embodiment of the present disclosure;

an input/output interface 103, configured to implement information input and output;

a communication interface 104, configured to implement communication interaction between this equipment and other equipment through wired methods (such as a USB and a network cable) or wireless methods (such as a mobile network, WIFI and Bluetooth); and a bus 105, which transmits information among various components of the equipment (such as the processor 101, the memory 102, the input/output interface 103, and the communication interface 104).

In an implementation, the processor 101, the memory 102, the input/output interface 103, and the communication interface 104 realize communication connections thereamong within the equipment through the bus 105.

An embodiment of the present disclosure further provides a computer-readable storage medium that stores a computer-executable instruction, and the computer-executable instruction, when executed by a computer, causes the computer to execute the above image display method.

As a non-transitory computer-readable storage medium, the memory can be configured to store non-transitory software programs and non-transitory computer executable programs. In addition, the memory may include a high-speed random access memory and may further include a non-transitory memory, such as at least one magnetic disk storage device, flash memory device, or another non-transitory solid-state storage device. In some implementations, the memory may optionally include memories located remotely from the processor, and the remote memories may be connected to the processor via a network. Examples of the above-mentioned networks include, but are not limited to, the Internet, intranets, local area networks, mobile communication networks and combinations thereof.

The device embodiments described above are only schematic, and the units described as separate components may or may not be physically separated, that is, they may be located in one place, or they may be distributed to a plurality of network units. Some or all of the modules may be selected according to actual needs to implement the solution of this embodiment.

Those of ordinary skill in the art may understand that all or some steps and systems in the method disclosed above may be implemented as software, firmware, hardware, and appropriate combinations thereof. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable medium which may include a computer storage medium (or a non-transitory medium) and a communication medium (or a transitory medium). As is known to those of ordinary skill in the art, the term computer storage medium includes volatile and nonvolatile media, and removable and non-removable media implemented in any method or technology for storage of information such as computer readable instructions, data structures, program modules or other data. The computer storage medium includes, but is not limited to, an RAM, an ROM, an EEPROM, a flash memory or another memory technology, a CD-ROM, a Digital Versatile Disk (DVD) or another optical disk storage, a magnetic cassette, a tape, a disk storage or another magnetic storage device, or any other medium that can be configured to store the desired information and that may be accessed by a computer. Additionally, it is known to those of ordinary skill in the art that the communication medium typically includes computer readable instructions, data structures, program modules or other data in a modulated data signal such as a carrier wave or another transport mechanism, and may include any information delivery media.

The embodiments of the present disclosure have been described in detail above with reference to the accompanying drawings. However, the present disclosure is not limited to the above embodiments. Within the scope of knowledge possessed by those of ordinary skill in the art, various modifications can be made without departing from the gist of the present disclosure. In addition, the embodiments of the present disclosure and the features in the embodiments may be combined with each other without conflict.

What is claimed is:

1. An image display method, comprising:
acquiring an original image;
performing image analysis on the original image according to a pre-set image analysis model to obtain a target depth map;
performing image synthesis on the target depth map according to a pre-set virtual viewpoint synthesis algorithm to obtain a plurality of target images from different viewing angles, wherein each of the plurality of target images has a respective one of multiple viewing angles;
collecting the plurality of the target images to obtain a target image set; and
emitting, by a light splitting element, each of the plurality of the target images in the target image set to a respective one of multiple directions to display the plurality of the target images from different viewing angles, such that a target user in a first position with a first primary vision area and a corresponding first viewing angle information views a first set of the plurality of the target images.

2. The image display method according to claim 1, wherein both a current primary vision area and current viewing angle information of the target user change with a position where the target user is located, after emitting, by the light splitting element, each of the plurality of target images in the target image set to the respective one of multiple directions to display the plurality of the target images from different viewing angles, the method further comprises:
adjusting a target image displayed in the current primary vision area of the target user, comprising:
in response to the target user moving to a second position from the first position, acquiring second viewing angle information of the target user as the current viewing angle information;
determining a second primary vision area corresponding to the second viewing angle information as the current primary vision area of the target user according to the second viewing angle information; and switching the first set of the plurality of the target images to a second set of the plurality of the target images to adapt to the second primary vision area of the target user.

3. The image display method according to claim 2, wherein before performing the image analysis on the original image according to the pre-set image analysis model to obtain the target depth map, the method further comprises:
training a neural network model to obtain the image analysis model, comprising:
acquiring an image training data set and a loss function; and
training the neural network model according to the loss function and the image training data set to obtain the image analysis model.

4. A non-transitory computer-readable storage medium, wherein the computer-readable storage medium stores a computer-executable instruction, and the computer-executable instruction, when executed by a computer, causes the computer to execute the method according to claim 2.

5. The image display method according to claim 1, wherein the light splitting element is provided with a light splitting area and a through hole area; and emitting, by light splitting element, each of the plurality of target images in the target image set to the respective one of multiple directions to display the plurality of target images from different viewing angle comprises:
emitting, by the light splitting area of the light splitting element, each of the plurality of target images in the target image set to the respective one of multiple directions to display the plurality of the target images from different viewing angles.

6. The image display method according to claim 5, wherein after emitting, by light splitting element, each of the plurality of target images in the target image set to the respective one of multiple directions to display the plurality of the target images from different viewing angle, the method further comprises:
displaying a target picture in a target image from the plurality of target images through the through hole area of the light splitting element, comprising:
acquiring a plurality of display parameters comprising: a resolution and a content type;
acquiring an image picture in the target image that satisfies the plurality of display parameters to obtain the target picture; and
displaying the target picture through the through hole area of the light splitting element.

7. The image display method according to claim 6, wherein before performing the image analysis on the original image according to the pre-set image analysis model to obtain the target depth map, the method further comprises:
training a neural network model to obtain the image analysis model, comprising:
acquiring an image training data set and a loss function; and
training the neural network model according to the loss function and the image training data set to obtain the image analysis model.

8. A non-transitory computer-readable storage medium, wherein the computer-readable storage medium stores a computer-executable instruction, and the computer-executable instruction, when executed by a computer, causes the computer to execute the method according to claim 6.

9. The image display method according to claim 5, wherein before performing the image analysis on the original image according to the pre-set image analysis model to obtain the target depth map, the method further comprises:

training a neural network model to obtain the image analysis model, comprising:

acquiring an image training data set and a loss function; and training the neural network model according to the loss function and the image training data set to obtain the image analysis model.

10. A non-transitory computer-readable storage medium, wherein the computer-readable storage medium stores a computer-executable instruction, and the computer-executable instruction, when executed by a computer, causes the computer to execute the method according to claim 5.

11. The image display method according to claim 1, wherein before performing the image analysis on the original image according to the pre-set image analysis model to obtain the target depth map, the method further comprises:

training a neural network model to obtain the image analysis model, comprising:

acquiring an image training data set and a loss function; and training the neural network model according to the loss function and the image training data set to obtain the image analysis model.

12. A non-transitory computer-readable storage medium, wherein the computer-readable storage medium stores a computer-executable instruction, and the computer-executable instruction, when executed by a computer, causes the computer to execute the method according to claim 11.

13. A non-transitory computer-readable storage medium, wherein the computer-readable storage medium stores a computer-executable instruction, and the computer-executable instruction, when executed by a computer, causes the computer to execute the method according to claim 1.

14. An image display device, comprising:

an acquisition module, configured to acquire an original image;

an analysis module, configured to perform image analysis on the original image according to a pre-set image analysis model to obtain a target depth map;

a synthesis module, configured to perform image synthesis on the target depth map according to a pre-set virtual viewpoint synthesis algorithm to obtain a plurality of target images from different viewing angles, wherein each of the plurality of target images has a respective one of multiple viewing angles;

a collection module, configured to collect the plurality of the target images from different viewing angles to obtain a target image set; and a light splitting element, configured to emit each of the plurality of target images in the target image set to a respective one of multiple directions to display the plurality of the target images from different viewing angles, such that a target user in a first position with a first primary vision area and a corresponding first viewing angle information views a first set of the plurality of the target images.

15. The image display device according to claim 14, wherein the acquisition module, the analysis module, the synthesis module, and the collection module are integrated in an image processing terminal device, and the light splitting element comprises: a grating screen and a housing, and wherein the grating screen is carried on the housing, the housing is sleeved on the image processing terminal, and the housing is adapted to the image processing terminal device.

16. The image display device according to claim 15, wherein the image processing terminal device is provided with a first image collector, the housing defines an opening corresponding to the first image collector, the housing is provided with a through hole area, and the housing is provided with a plurality of second image collectors, at least one of the plurality of second image collectors is located on a side of the grating screen, and the rest of the plurality of second image collectors are located on an opposite side of the grating screen.

17. An electronic equipment, comprising:

at least one processor, and, a memory communicatively connected to the at least one processor; wherein the memory stores an instruction executable by the at least one processor, and the instruction, when executed by the at least one processor, causes the at least one processor to execute an image display method, comprising:

acquiring an original image;

performing image analysis on the original image according to a pre-set image analysis model to obtain a target depth map;

performing image synthesis on the target depth map according to a pre-set virtual viewpoint synthesis algorithm to obtain a plurality of target images from different viewing angles, wherein each of the plurality of target images has a respective one of multiple viewing angles;

collecting the plurality of the target images to obtain a target image set; and emitting, by a light splitting element, each of the plurality of the target images in the target image set to a respective one of multiple directions to display the plurality of the target images from different viewing angles, such that a target user in a first position with a first primary vision area and a corresponding first viewing angle information views a first set of the plurality of the target images.

18. The electronic equipment according to claim 17, wherein both a current primary vision area and current viewing angle information of the target user change with a position where the target user is located, after emitting, by the light splitting element, each of the plurality of target images in the target image set to the respective one of multiple directions to display the plurality of the target images from different viewing angles, the method further comprises:

adjusting a target image displayed in the current primary vision area of the target user, comprising:

in response to the target user moving to a second position from the first position, acquiring second viewing angle information of the target user as the current viewing angle information;

determining a second primary vision area corresponding to the second viewing angle information as the current primary vision area of the target user according to the second viewing angle information; and switching the first set of the plurality of the target images to a second set of the plurality of the target images to adapt to the second primary vision area of the target user.

19. The electronic equipment according to claim 17, wherein the light splitting element is provided with a light splitting area and a through hole area; and emitting, by the light splitting element, each of the plurality of target images in the target image set to the respective one of multiple directions to display the plurality of target images from different viewing angle comprises:

emitting, by the light splitting area of the light splitting element, each of the plurality of target images in the target image set to the respective one of multiple directions to display the plurality of the target images from different viewing angles.

20. The electronic equipment according to claim 19, wherein after emitting, by light splitting element, each of the plurality of target images in the target image set to the respective one of multiple directions to display the plurality of the target images from different viewing angle, the method further comprises:

displaying a target picture in a target image from the plurality of target images through the through hole area of the light splitting element, comprising:

acquiring a plurality of display parameters comprising: a resolution and a content type;

acquiring an image picture in the target image that satisfies the plurality of display parameters to obtain the target picture; and displaying the target picture through the through hole area of the light splitting element.

\* \* \* \* \*